Figure 1:
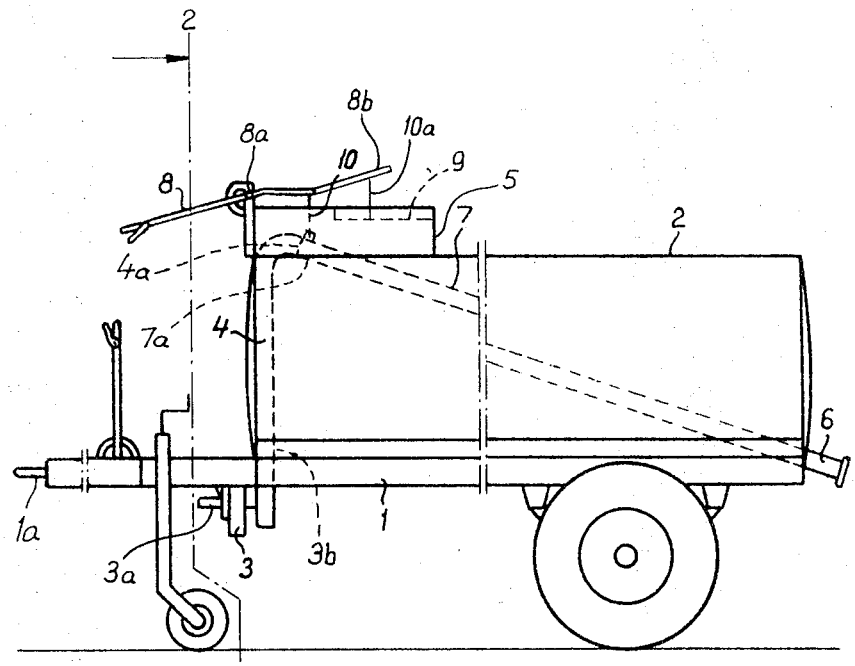

United States Patent

[11] 3,587,932

| [72] | Inventor | Engelbert Baum<br>Wien, Austria |
|---|---|---|
| [21] | Appl. No. | 844,912 |
| [22] | Filed | July 25, 1969 |
| [45] | Patented | June 28, 1971 |
| [73] | Assignee | Alfa-Laval AB<br>Tumba, Sweden |
| [32] | Priority | Aug. 5, 1968 |
| [33] | | Austria |
| [31] | | A7609/68 |

[54] TRANSPORT CONTAINER FOR LIQUID DUNG
6 Claims, 2 Drawing Figs.

[52] U.S. Cl.................................................. 222/178,
222/318, 239/127
[51] Int. Cl.............................................. A01c 15/00
[50] Field of Search........................................ 222/178,
318; 239/142, 127, 662

[56] References Cited
UNITED STATES PATENTS

| 3,411,672 | 11/1968 | Van Der Lely et al........ | 222/178X |
| 3,420,452 | 1/1969 | Vaughan...................... | 222/178X |
| 3,489,320 | 1/1970 | MacKinnon.................. | 222/178X |

*Primary Examiner*—Lloyd L. King
*Assistant Examiner*—John J. Love
*Attorney*—Davis, Hoxie, Faithfull and Hapgood ABSTRACT: The transport container has a pump by which liquid dung in the container is forced through a rising pressure pipe terminating in the upper part of the container adjacent the inlet end of a feed pipe, the latter extending to a pressure outlet for spreading the liquid dung on a field. The inlet end of the feed pipe is adjustable relative to the adjacent end of the rising pressure pipe, whereby the liquid dung can be selectively spread through the pressure outlet or circulated within the container.

PATENTED JUN28 1971     3,587,932

INVENTOR.
ENGELBERT BAUM
BY
Davis, Hoxie, Faithfull & Hapgood
ATTORNEYS

TRANSPORT CONTAINER FOR LIQUID DUNG

The present invention relates to a transport container, especially a tank carriage, for liquid dung and having a pump mounted on it and a pressure outlet for spreading the liquid dung on the field.

Liquid dung is obtained in the care of animals, especially cattle in a shed, if the natural excrements of the animals are not mixed with straw or other litter but flow, practically without any admixture of extraneous solids, into a storage container. After having been homogenized by mechanical means, the liquid dung is filled from this container (in which there are formed a solid surface layer, a solid bottom layer and a liquid intermediate layer) into transport containers and is carted by these to the field so as to be spread there.

The pump used in the present transport container has at least two functions, namely, on one hand to agitate the liquid dung within the container so that the homogenous condition of the dung is maintained, and on the other hand to feed the pressure outlet so as to spread the dung on the field. Furthermore, the pump can be dimensioned so that it is capable of feeding the liquid dung from the storage container to the transport container. The adjustment of the operating condition (agitating or spreading) is effected by means of cocks or valves. Such means, however, have the disadvantage that they can cause trouble due to the consistency of the feed material. Furthermore, the chemically aggressive nature of the liquid dung has an unfavorable influence on the length of life of the valves, which are not inexpensive.

In order to avoid these disadvantages, it is proposed according to the present invention to provide the transport container with an arrangement wherein the pump outlet is connected to a rising pressure pipe, preferably rising within the container and in every case terminating within the container, and a feed pipe extending to the pressure outlet (preferably provided at the deepest place of the container) has an inlet end closely adjacent the upper end of the pressure pipe; and of these adjacent pipe ends, the feed pipe end is adjustable, preferably in a vertical direction, in relation to the pressure pipe end. It is suitable if the ends of the pressure pipe and the feed pipe to be brought into connection with each other are located within a supply pipe stub of the container or somewhat below this stub. It is then possible to connect the cover of the supply pipe stub to the means for adjusting the feed pipe end so that the cover is kept closed when the liquid dung is spread through the pressure outlet but is kept open when the dung is circulated within the container.

It will be apparent that the invention makes it possible to cause the pump to feed the pressure outlet or to effect agitation of the liquid dung within the container, depending upon whether the cooperating ends of the pressure pipe and the feed pipe are aligned or are offset from one another. When the pipe ends only partly cover each other, the rate at which the liquid dung is fed to the pressure outlet is reduced correspondingly. These results are attained without the use of valves; and manufacturing tolerances are not necessary because the slot remaining between the aligned pipe ends causes only an unessential reduction of the dung-feeding rate through the pressure outlet, and the dung quantities discharging through the slot remain in the container.

Figure 2:
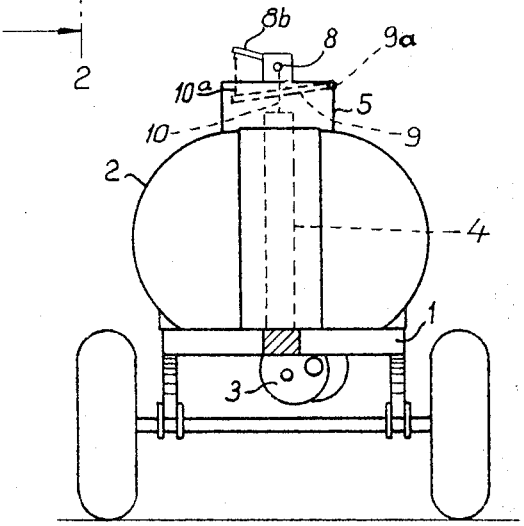

The accompanying drawing illustrates schematically an embodiment of a container according to the invention in the form of a tank carriage, which is shown in side elevation in FIG. 1, FIG. 2 being a front elevational view on line 2—2 in FIG. 1.

A chassis 1, arranged to be coupled at 1a to a tractor (not shown), carries a container 2 on the front end of which a pump 3 is mounted, the latter being adapted to be driven from the tractor by means of a shaft 3a. The pump sucks liquid dung into the pump inlet from the vicinity of the container bottom and forces it upward from the pump outlet 3b through a pressure pipe 4, which terminates within a supply pipe stub 5. A pressure outlet 6 is provided for spreading the liquid dung on the field and is arranged at the bottom of the back end of the container 2, where it is fed by means of a pipe 7. This feed pipe has an inlet end 7a closely adjacent the upper end 4a of pressure pipe 4. As shown in FIG. 1, the adjacent pipe ends 4a and 7a are aligned with each other so that pump 3 feeds dung from pipe 4 into feed pipe 7 and consequently to the outlet 6.

The feed pipe 7, at least its portion adjacent the pressure pipe 4, is adjustable vertically so as to offset its inlet end 7a from alignment with the upper end 4a of the pressure pipe. For this purpose, a lever 8 is pivotally mounted intermediate its ends at 8a on an extension of the supply pipe stub 5, and the rear end of this lever is connected by a depending link 10 to the inlet end 7a of pipe 7. Thus, the front end of lever 8 can be raised to lower the inlet end 7a relative to the upper or outlet end of pressure pipe 4, whereby only part of the pumped dung is fed through feed pipe 7 to the pressure outlet 6; and by further raising the front end of lever 8, the inlet end 7a can be lowered sufficiently so that no dung is fed to the pressure outlet 6. In the latter case, the liquid dung is merely circulated within the container by the pump 3 and thereby agitated and homogenized. It will be understood that the feed pipe 7 may be sufficiently flexible to accommodate vertical adjustment of its inlet end 7a between the illustrated upper position, in alignment with pipe end 4a, and the aforementioned lower position (not shown) wherein none of the pumped dung will be fed through pressure outlet 6.

The supply pipe stub 5 is shown with a cover 9 hinged at 9a. In order to simplify the attendance of the container, the cover 9 may be connected through a traction rope 10a to an arm 8b extending from the rear end of lever 8. Accordingly, when lever 8 is actuated to lower the inlet end 7a of pipe 7, the cover 9 automatically swings downward about its hinge 9a (FIG. 2), the cover opening wider as the downward movement of pipe end 7a progresses. The cover 9 is therefore open when the dung is agitated within the container. However, when lever 8 is actuated to return the pipe end 7a upward into alignment with the pressure pipe end 4a, the cover 9 is automatically raised to its closed position. This closing of the cover while the dung is being spread, that is, while pressure prevails in the slot between the aligned pipe ends 4a and 7a, is desirable because such pressure causes the dung to spurt around in the container.

The invention has been illustrated by means of a tank carriage, but it is obvious that the presence of a chassis is not essential. The tank could be manufactured together with the pump and other details as a unit, and when necessary the farmer could put it on a suitable carriage.

I claim:

1. In combination with a transport container for liquid dung, the container having a pressure outlet for spreading the liquid dung on a field, a pump mounted on the container and having an outlet through which liquid dung in the container is adapted to be pumped, a pressure pipe connected to the pump outlet and extending upwardly therefrom, said pipe having an upper end terminating within the container, a feed pipe extending to said pressure outlet and having an inlet end adjacent said upper end of the pressure pipe, and means for adjusting said inlet end of the feed pipe relative to said adjacent end of the pressure pipe, whereby liquid dung can be selectively spread through said pressure outlet or circulated within the container.

2. The combination according to claim 1, in which said pressure pipe rises within the container.

3. The combination according to claim 1, in which said pressure outlet is at the deepest part of the container.

4. The combination according to claim 1, in which said inlet end of the feed pipe is adjustable vertically.

5. The combination according to claim 1, in which the container also has a supply pipe stub at the upper portion of the container, said adjacent ends of the pressure and feed pipes being located substantially within the press supply pipe stub.

6. The combination according to claim 5, in which said supply pipe stub has a cover movable between open and closed positions, said adjusting means being operatively connected to the cover to keep it closed when the liquid dung is spread through the pressure outlet and to open the cover when the dung is circulated within the container.